I. A. Ayres,
Automatic Gate,
Nº 14,131.     Fig.1     Patented Jan. 22, 1856.
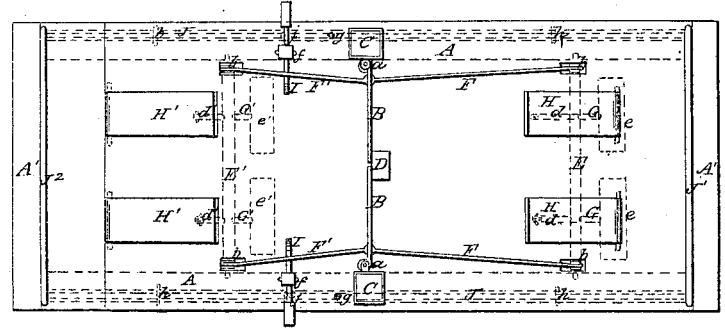
Fig. 2
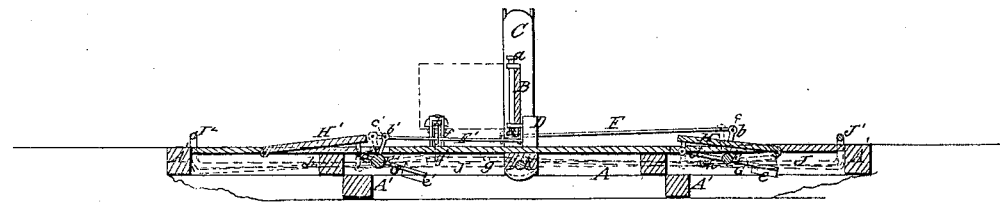
Fig. 3
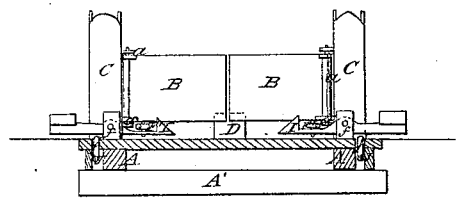

UNITED STATES PATENT OFFICE.

J. A. AYRES, OF HARTFORD, CONNECTICUT.

METHOD OF OPENING AND CLOSING FARM-GATES.

Specification of Letters Patent No. 14,131, dated January 22, 1856.

*To all whom it may concern:*

Be it known that I, J. A. AYRES, of Hartford, in the county of Hartford and State of Connecticut, have invented a new and useful Improvement in Self-Opening and Self-Closing Farm-Gates; and I do hereby declare that the following is a full, clear, and exact description of the same, reference being had to the accompanying drawings, forming part of this specification, in which—

Figure 1, is a plan or top view of a gate constructed and arranged for operating after my invention. Fig. 2, is a vertical longitudinal section, and, Fig. 3, a vertical transverse section of the same.

Similar letters of reference indicate corresponding parts in the several figures.

My invention relates to an improvement in that description of farm gate which is made to open and close by the depression of swinging driving boards, and is intended to simplify the intermediate connections, lessen the liability of derangement, and avoid the use of long driving boards from which the wheels of the vehicle during careless driving often get off before the vehicle clears the gate's path and the gate consequently allowed to close upon the horse, and thereby cause much annoyance and delay, and if the horse be fractious endanger life and property.

The nature of my invention consists, 1st, in so arranging and combining the catches, which hold open or back the gate, with a double acting and self adjusting treadle, operated from each end of the gateway by the wheels of the vehicle, that they shall as soon as the gate is thrown open lock its two parts securely back and as soon as the vehicle escapes out of the path of the gate set said parts free and allow them to close together.

My invention consists, 2nd, in opening and closing each of the gates from the inside or outside of the farm yard by simply a rod and vibrating weighted crank shaft, which are connected to the gate and swinging driving boards and made to operate upon the former by the action of the latter in the manner hereinafter shown.

It is by locking the gate back that the use of long driving boards is dispensed with and it is by combining the catches which lock them thus, with the double acting treadle that their use is rendered practicable as this arrangement enables me through the action of the wheels to release the gates and allow them to close as soon as the vehicle has escaped out of their path. And it is by the use of the weighted crank shaft combined with the driving boards and gates as stated that simplicity is secured and liability of derangement lessened.

To enable those skilled in the art to make and use my invention, I will proceed to describe its construction and operation.

A, A', represent a series of sills or timbers for arranging the operating mechanism upon; B, B, the two parts of a folding farm gate made in the ordinary way and swinging on hinges $a$, $a$, which are attached to the posts C, C; and D, the central stop against which the parts B, B, close.

E, E', are vibrating crank shafts placed transversely on the sills A. These shafts are situated one inside and the other outside the farm yard some distance from the gate B, B.

F, F, F', F', are rods for connecting the shafts E, E', with the gates; these rods are attached to the cranks $b$, $b$, $b'$, $b'$, of the shafts E, E', by fulcrum pins $c$, $c$, and are carried along obliquely and attached near the hinges eccentrically to the bottom of the parts of the gate. Both crank shafts are arranged to turn in the same direction, and the parts of the gate consequently open always one way like an ordinary gate. And by arranging the rods F, F', as stated, and attaching them near the hinges the gates are always readily opened by a very short movement.

G, G, G', G', are arms extending out from the crank shaft and having weights $e$, $e$, $e'$, $e'$, on their ends for the purpose of throwing the cranks back to their proper position and thereby closing the two parts of the gate.

H, H, H', H', are the swinging driving boards placed over the crank shafts and attached to them by jointed elbow links $d$, $d$, $d'$, $d'$, as shown. When either pair of these boards, H, H, for instance, is depressed by the wheels of the vehicle, the crank shafts are caused to perform a quarter of a revolution and consequently the cranks $b$, $b$, $b'$, $b'$, are thrown forward the driving boards H, H, depressed and the two parts of the gate opened; and thus a clear and even passage provided for the horse and vehicle. The same result is effected when the driving boards H', H', are depressed by the wheels of the vehicle. I, I, are the catches for locking back the gates after they are opened, they are situated as shown, and hung on pins $f, f$, and weighted on their outer ends so as to adjust themselves after being depressed by the gate passing over their inner ends.

J, J, J', J² designate the double acting treadle for operating the catches in a manner to release the two parts of the gate, as soon as the horse and vehicle have escaped out of the gate's path. This treadle is made to extend from one end of the gateway to the other being arranged outside the timbers A', A', as shown; each of its longitudinal side pieces J, J, is made in two parts, which are joined loosely together at $g, g$, and each has a fulcrum at $h$, and is bent upward at right angles at its extremity and united together by the end cross pieces J', J², which stand slightly above the level of the road. On the side pieces J, J, at points immediately under the catches vertical arms $j, j$, are provided for the purpose of operating upon the rear ends of the catches in a manner to release the two parts of the gate as soon as the wheels of the vehicle come upon the end pieces of the treadle. At the center of the length of the side pieces J, J, a weighted rod $k$, is provided for the purpose of adjusting the treadle after it has been depressed. The end pieces J', J², should always be sufficiently far from the driving boards to allow of the hind wheels of the vehicle escaping over them before the fore wheels pass off the driving boards, this is necessary in order to prevent the catches being operated upon in a manner to release the two parts of the gate after the wheels have passed off of the driving boards.

Operation: The vehicle in approaching the gate from the outside of the yard passes over the end piece J', of the treadle, and then upon the driving boards H, H, depresses them, as shown in red, and thereby causes the shaft E, to turn and its cranks to move forward sufficiently to open the two parts of the gate, as shown in red. As the parts of the gate go back or open they operate upon the catches in a manner to cause them to lock them back securely, simultaneously with the depression of the driving boards H, those H', are also caused by the crank shaft E', operated through the gate and the connecting rods F', F', to assume a horizontal position with the gateway, as shown in red, and thus offer no obstruction to the vehicle. The gate being thus opened the vehicle passes along over the driving boards H', H', without effecting the operating mechanism until its fore wheels come in contact with the end piece J² of the treadle, when by the depression of said end piece it operates upon the catches I, I, and releases the two parts of the gate, and allow them to close together again by reason of the crank shaft through the action of the weights assuming their original position. Of course when the crank shafts are thus operated the driving boards also assume their original position, and the treadle, when the vehicle escapes over it assumes its proper position. The operation is precisely the same in passing through the gate from the inside as from the outside of the yard.

What I claim as my invention and desire to secure by Letters Patent, is—

1. The employment and arrangement of the double acting self adjusting jointed treadle J J, J', J², in combination with the self locking catches I, I, substantially as, and for the purpose set forth.

2. Opening and closing the two parts of the gate and readjusting the driving boards H H' by means of the simple arrangement of mechanism herein shown, consisting of weighted crank shafts E, E', elbow links $d, d'$, and connecting rods F, F', arranged and combined with the two parts of the gate B, B, and the driving boards H H' as described.

J. A. AYRES.

Witnesses:
   Jos. R. Hawley,
   John Hooker.